UNITED STATES PATENT OFFICE.

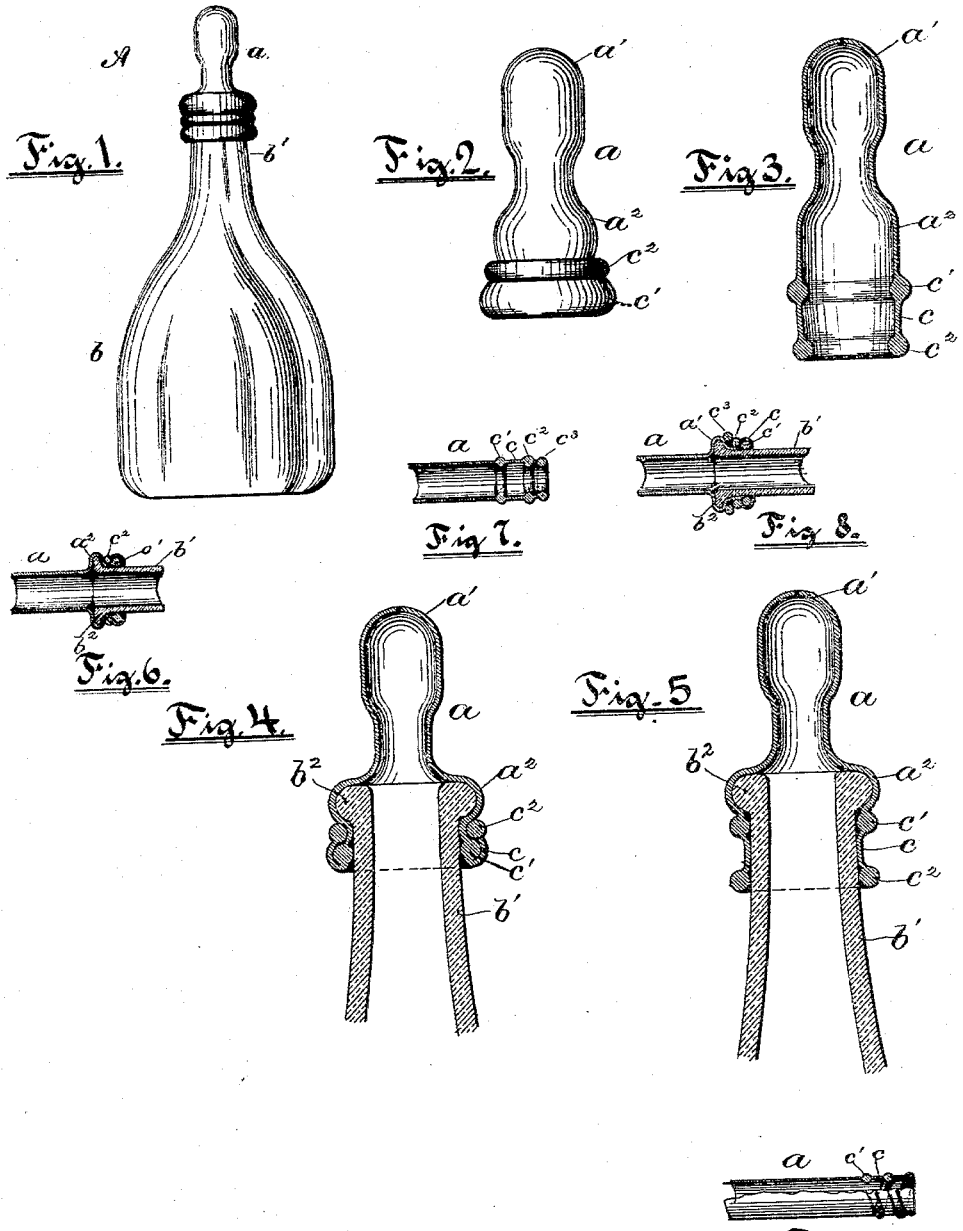

EUGENE C. MYRICK, OF PROVIDENCE, RHODE ISLAND.

NIPPLE FOR NURSING-BOTTLES.

SPECIFICATION forming part of Letters Patent No. 556,859, dated March 24, 1896.

Application filed August 27, 1895. Serial No. 560,636. (No model.)

*To all whom it may concern:*

Be it known that I, EUGENE C. MYRICK, a citizen of the United States, residing at Providence, in the county of Providence and State of Rhode Island, have invented certain new and useful Improvements in Means for Attaching Tubular Articles of Rubber to the Necks of Bottles, Syringes, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improved means for attaching tubular articles of rubber to the necks of bottles, syringes, &c., and it consists essentially in providing such elastic articles with a plurality of integral packing rings or members capable of being expanded over and contracted around the bottle's neck or other object or piece to which the rubber article is to be secured, all as will be more fully hereinafter set forth and claimed.

Hitherto in rubber articles of the class above referred to—as, for example, nipples for nursing-bottles, tubes for syringes, &c.— it has been usual to simply insert the enlarged or beaded end of such bottle or syringe into the base or adjacent part of the nipple or tube, said part at the same time being first expanded for the purpose, it being held in place by the contraction of the rubber around the contiguous portion of the bottle, &c. Sometimes the walls of the open end of the nipple or tube have been thickened so as to increase its holding power.

There are objections to such former construction from the fact that the elastic or rubber members are liable to become accidentally detached in use. This defect is particularly true or apparent in nursing-bottles having rubber nipples, especially so when the exterior surface of the neck of the bottle becomes wet with the milk or other fluid nourishment employed.

The object I have in view is to provide certain articles made of rubber with an inexpensive attaching device adapted to be removably secured to nursing-bottles, syringes, nozzles, &c., said device being constructed so that while it may be readily attached to and detached from such bottle, &c., when desired, yet at the same time it is practically impossible for the parts to become accidentally detached.

In the accompanying sheet of drawings, Figure 1 is a side elevation representing my improvement as applied to the rubber nipple of an ordinary nursing-bottle. Fig. 2 is a side elevation of the nipple itself, in enlarged scale, ready for attachment and use. Fig. 3 is a vertical central sectional view of the nipple before the auxiliary packing member is upturned. Fig. 4 is a vertical central sectional view, enlarged, taken through the upper portion of the bottle and nipple, corresponding with Fig. 1. Fig. 5 is a sectional view similar to Fig. 3, but showing the nipple attached to the bottle's neck. Fig. 6 shows a rubber tube provided with my improvement and attached, say, to a tube or nozzle of a syringe; and Figs. 7, 8, and 9 are views showing modified forms of the attaching device.

In the drawings, $a$ indicates an article made of rubber or other suitable elastic substance having its lower or attaching portion $a^2$ provided with my improvement.

In Fig. 1, A indicates a nursing-bottle combined with a rubber nipple $a$ having my improved attaching device. The said improved nipple is shown detached in Fig. 2. The annular base portion $a^2$ of the rubber article $a$ is extended, as at $c$, Figs. 3, 5 and 7, the walls thereof being provided with a plurality of peripheral enlargements or self-sealing auxiliary packing-rings integral therewith, as $c'$ $c^2$ $c^3$. These are capable of being expanded over the enlarged or beaded end $b^2$ of the neck $b'$ of a nursing-bottle, as shown in Figs. 1, 4 and 5, or a nozzle or tube $b'$, as shown in Fig. 6. I prefer to make the lowest or end ring normally smaller in diameter interiorly than the other ring or rings, so as to insure greater holding power when in use.

In employing my improved nipple or other article $a$ I prefer to first roll or turn back the lower portion past the upper ring $c'$, substantially as shown in Fig. 2, before it is applied to the bottle, as in this form it can be attached to or detached from the bottle or other object with greater facility.

Figs. 4, 6 and 8 show the device properly attached. It will be seen that the main packing-ring $c'$ snugly engages the exterior surface of the neck or shank $b'$ at a point below the end or beaded part $b^2$, and that the outer part of the auxiliary ring $c^2$ is stretched and rolled over and in close contact with the said extension $c$, and at the same time lying in the circular groove or depression formed intermediate of the bead $b^2$ and ring $c'$. (See Fig. 4.)

In Fig. 6 the packing members are applied to the tube $b'$ in substantially the same manner as just described with respect to the nipple $a$. Fig. 7 shows the rubber attachable member $a$ provided with a series of three rings. One or two of these may be somewhat smaller in area cross-sectionally than the main ring $c'$. Fig. 8 shows the same completely attached to a tube or nozzle, as $b'$. In Fig. 9 the end or base of the rubber member $a$ is provided with an integral packing-ring $c'$ arranged in the form of a spiral, the same extending, say, two or more times around it.

It will be apparent that upon pulling the upper portion or tip $a'$ of the nipple in any direction such action will not possibly detach it from the bottle, but instead the material or rubber composing it will be ruptured, as has been repeatedly demonstrated. This is due to the fact that while it is under such extreme tension any tendency of the ring $c'$ to be drawn upward over the end of the neck past the bead or enlargement $b^2$ is counteracted by the exterior ring $c^2$—that is to say, any expansion or increase in diameter of the ring $c'$ is resisted in a corresponding or geater degree by the contractive force of the auxiliary ring $c^2$.

In some cases the usual rubber nipples or attachable members have had the base portions provided with thick end walls adapted to be expanded over the end of the bottle. When thus constructed they are, it is true, not so liable to become accidentally detached. It is, however, a very difficult matter to attach them to the bottles, since the operation involves the exercise of comparatively great force and at the same time consumes considerable time. By providing the base portion $a^2$ with a plurality of packing members integral with said base portion, substantially as in my improved device, it becomes a comparatively easy matter to attach it to the bottle, although the combined area of such members may exceed that of the nipple having thickened walls, just referred to.

I do not claim, broadly, as my invention a nipple for nursing-bottles having the walls of the base or attaching portion thereof thicker than the walls of the upper or tip portion, nor do I claim an auxiliary packing-ring separable from the nipple; but What I do claim is—

1. A tubular rubber article of the class hereinbefore described, having its end or attachable portion provided with a plurality of rings or packing members integral with said end portion capable of being distended over a flanged or beaded member and arranged to be rolled or turned rearwardly upon itself, for the purpose specified.

2. The nursing-bottle nipple substantially as described and composed of elastic material, as rubber, the same having its lower or base portion provided with a main packing-ring $c'$ and a supplemental packing-ring $c^2$, all integral with the nipple, said supplemental packing-ring being normally smaller in diameter than the main ring and arranged to be rolled or turned rearwardly past said main ring, for the purpose hereinbefore described.

3. In an article of the class hereinbefore described, the combination, with the head or major part, of an elastic annular base or end portion $c$ having a pair of packing-rings, $c'$, $c^2$, integral with and forming a part of said base capable of being distended over the end of a suitable tube and having the said ring part $c^2$ arranged to be rolled rearwardly upon the base to form an outer packing and at the same time reinforcing the base, substantially as set forth.

In testimony whereof I have affixed my signature in presence of two witnesses.

EUGENE C. MYRICK.

Witnesses:
 GEO. H. REMINGTON,
 REMINGTON SHERMAN.